Dec. 12, 1950   C. G. KOONTER   2,533,475
REARVIEW MIRROR FOR MOTOR VEHICLES
Filed June 4, 1949

INVENTOR.
Carlton G. Koonter
BY
A. E. Wilson
Attorney.

Patented Dec. 12, 1950

2,533,475

UNITED STATES PATENT OFFICE 2,533,475

REARVIEW MIRROR FOR MOTOR VEHICLES

Carlton G. Koonter, Fairhaven, Mich., assignor to George C. Knight Company, Oak Park, Mich., a corporation of Michigan Application June 4, 1949, Serial No. 97,174

5 Claims. (Cl. 248—205)

1

This invention relates to rear view mirrors for motor vehicles, and more particularly to universally mounted mirrors which can be readily adjusted to permit a driver of a vehicle to observe traffic conditions behind the vehicle on both sides thereof.

Rear view mirrors have been extensively used on motor vehicles to enable the driver to observe road and traffic conditions behind the vehicle. As such mirrors have been constructed heretofore it has been virtually impossible for a driver of a left hand drive vehicle to adjust a mirror on the right hand side of the vehicle in such a manner as to enable him to observe road and traffic conditions behind the vehicle on the right hand side. The same is of course true with drivers of right hand drive vehicles in that it has been extremely difficult for them to adjust the mirror on the left hand side of the vehicle to enable them to observe conditions behind the vehicle on the left hand side.

Many attempts have been made to overcome these difficulties, and while dual rear view mirrors have been used on many vehicles, they are generally employed to give the vehicle a balanced appearance, the driver obtaining virtually no benefits from the mirror positioned on the side of the vehicle opposite the driver's compartment.

In an effort to enable a driver to observe conditions behind the vehicle on the side opposite the driver's compartment special supporting brackets have been employed to dispose the mirror at an appropriate angle that it can be viewed from the driver's compartment. These expedients have not met with commercial success because of the increased costs and other complications of providing left and right hand supporting brackets, and the fact that it has been impossible to design a single bracket that would be suitable for use on the various makes and models of vehicles.

I have found that these difficulties can be overcome by providing an additional readily operable adjustment between a mirror head assembly and a supporting bracket whereby the head assembly may be rotated in a plane substantially perpendicular to the longitudinal axis of the supporting base and of the vehicle, regardless of the plane in which the bracket is mounted on the vehicle. Insofar as I know, no one has provided an adjustment in this location. I have found that with this construction it is possible to provide a single rear view mirror assembly that can readily be used on opposite sides

2 of the vehicle to enable the driver to observe traffic and road conditions behind and on both sides of the vehicle. It is therefore only necessary to provide a single set of tooling for manufacturing the mirror, and it is unnecessary to stock left and right hand mirror assemblies. Manufacturing and selling costs are thus minimized.

An object of this invention is therefore to provide an improved rear view mirror assembly wherein the mirror may be readily adjusted, by rotating the head assembly in a plane substantially perpendicular to the axis of the supporting base after it is mounted on a vehicle to dispose the mirror in such a location that when positioned on either side of a vehicle, the driver of the vehicle can readily observe traffic and road conditions behind the vehicle.

A further object of this invention is to provide a rear view mirror of improved design having a manually operable adjustment between a supporting base and a mirror head assembly, and wherein an additional angular adjustment is provided between the mirror and the head assembly.

Another object of the invention resides in the provision of a finger tip adjustment between a mirror head assembly and a supporting base whereby the angular relation of the head assembly may be readily varied after the mirror assembly is mounted on a vehicle.

Still a further object of the invention is to provide an improved universal type mirror assembly having a minimum number of different parts, that can be manufactured economically, and which can be used on virtually all makes and models of vehicles.

Another object of the invention resides in the provision of a rear view mirror assembly having a supporting base adapted to be secured to the side of a vehicle, and a head assembly rotatably mounted on the supporting base whereby the head assembly may be rotated in a plane substantially perpendicular to the axis of the base to position the mirror in such a location that when used on either side of the vehicle, the driver can readily observe road and traffic conditions behind the vehicle.

Yet a further object of the invention is to provide a novel and improved method of securing a rear view mirror to the side of a vehicle in such a manner that it is substantially theft proof.

Another object is to provide a rear view mirror having separately operable adjustments whereby the mirror may be readily adjusted angularly through wide limits to accommodate it to individuals varying widely in stature to enable drivers to readily observe rear road and traffic conditions on both sides of the vehicle.

Further objects and advantages of the invention will be apparent from the following description, taken in connection with the appended drawings, in which.

Figure 1:
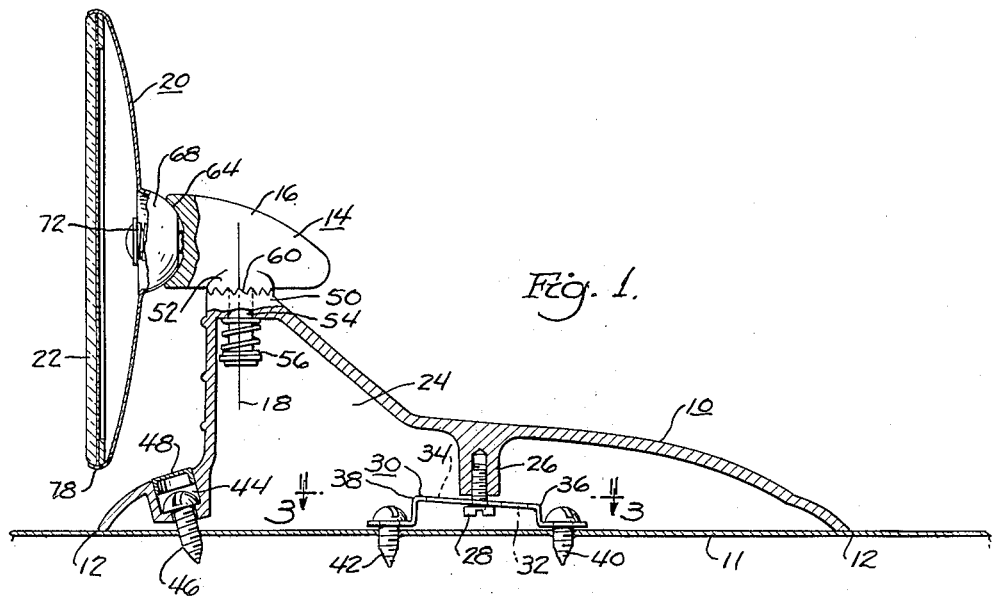
Fig. 1 is a longitudinal sectional view of a rear view mirror assembly embodying my invention.
Figure 2:
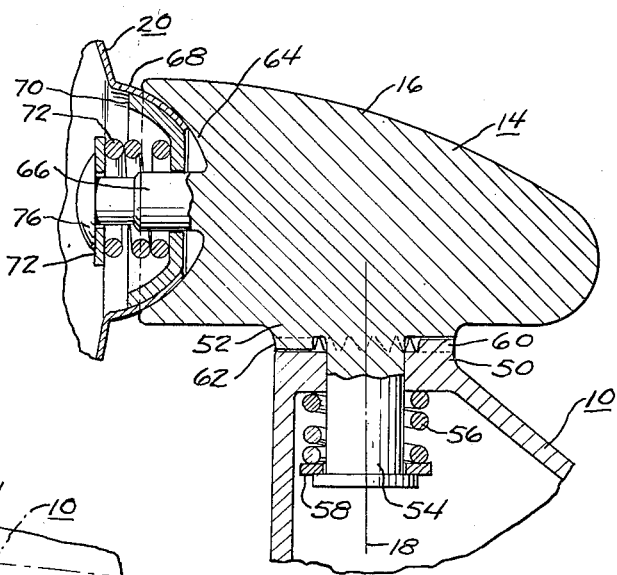
Fig. 2 is a fragmentary enlarged sectional view of a portion of the assembly illustrated in Fig. 1.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now more particularly to the drawings it will be noted that the rear view mirror assembly includes a supporting member or base 10 having an inner surface adapted to be secured to a side panel 11 of a motor vehicle and having a longitudinal axis 12—12. The supporting base 10 may embody any desired shape but is preferably of streamlined contour to harmonize with the styling of modern motor vehicles. A head assembly 14 having an intermediate member of body portion 16 is rotatably mounted on the supporting base 10 for adjustment angularly about an axis 18 extending substantially perpendicular to the longitudinal axis 12—12 of the base 10. A mirror shell 20 is mounted at one extremity of the body portion 16 for universal angular adjustment relative thereto, and the shell 20 supports the glass of a mirror 22.

The supporting base 10 may be formed in any desired manner as by die casting, and preferably has an elongated hollow portion 24 adapted to be secured to the side panel 11 of a motor vehicle with the mirror 22 facing toward the rear of the vehicle.

Figure 3:
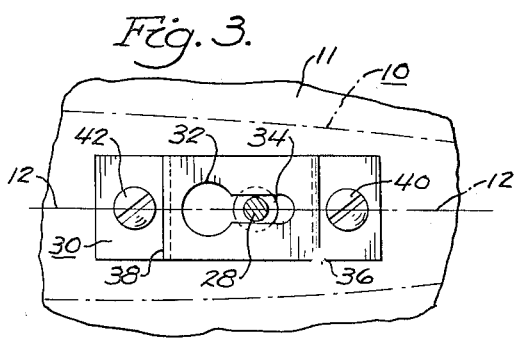
Fig. 3 is a fragmentary view taken substantially on the line 3—3 of Fig. 1 looking in the direction of the arrows.

Means defining a substantially theft proof fastening means are provided to secure the mirror assembly to the vehicle. The elongated hollow portion 24 of the supporting base 10 is provided with a reenforcing web 26 having its outer extremity threaded to receive a screw 28. As shown in Figs. 1 and 3 a cam bracket 30 is provided with a round aperture 32 to receive the head of the screw 28, and a slot 34 communicating with the aperture 32 to receive the shank of the screw 28. As shown in Fig. 1, one end 36 of the cam bracket 30 is shorter vertically than the other end 38 to provide a camming action to draw the portion 24 of the supporting base 10 into intimate contact with the side panel 11 of the vehicle, as the head of the screw 28 is projected through the aperture 32 in the bracket 30 and is shifted to move the head of the screw 28 in the slot 34 toward the end 36 of the bracket 30.

My improved mirror assembly is of the so-called panel type, and is adapted to be mounted on the panel 11 of the door, side panel, hood or fender of any motor vehicle. To mount the mirror assembly on the vehicle, the driver sits in the driver's seat, and a mounting position is selected for mirrors on opposite sides of the vehicle which permits the driver to obtain the most advantageous view of road and traffic conditions behind the vehicle. The cam bracket 30 is then suitably positioned on the selected portion of the vehicle, and an aperture is drilled into the side of the vehicle to receive one of the attaching screws 40. An aperture for the other attaching screw 42 is drilled into the vehicle and the cam bracket is securely clamped in place on the vehicle. The screws 40 and 42 are preferably of the self tapping type to eliminate the necessity of gaining access to the reverse side of the panel to which the mirror assembly is attached.

The mirror assembly is then positioned over the cam bracket, the head of the screw 28 projecting through the round aperture 32 in the bracket 30. The mirror assembly is then moved as described above to tighten the supporting base 10 into intimate contact with the portion of the vehicle to which the mirror assembly is to be attached. Another aperture is then drilled into the panel on other portion of the vehicle to which the mirror assembly is to be attached in alignment with an aperture 44 in the rear portion of the supporting base 10. A screw 46 preferably of the self tapping type is positioned in the aperture 44 and threaded into the associated portion of the vehicle to lock the supporting base 10 against loosening movement on the cam bracket 30. A closure plug 48 is then positioned in the aperture 44, and it is tapped into alignment with the outer surface of the supporting base. A neat appearance is thus insured, and a substantially theft proof attachment is provided because in order to remove the mirror assembly it is necessary to drill or otherwise mutilate the closure plug 48 to permit removing it to shift the base 10 on the bracket 30 to remove the mirror assembly from the vehicle.

The supporting base 10 extends outwardly from the vehicle and terminates in an outer substantially flat circular support 50 for the head assembly 14. The intermediate member or body portion 16 of the head assembly is provided with a similar substantially flat circular portion 52 adapted to engage the support 50 of the base 10. A round projection 54 formed on the body portion 16 of the head assembly 14 extends through an aperture in the support 50 of the base 10 to receive a spring 56 held in a tensioned position on the projection 54 by the flared end of the projection 54 engaging a washer 58 surrounding the projection 54. Cooperating serrations 60 and 62 formed on the support 50 of the base 10 and on the portion 52 of the head assembly 14 are provided to hold the head assembly in any angularly adjusted position to which it is moved about the axis of the projection 54 extending substantially perpendicularly to the longitudinal axis 12—12 of the supporting base 10.

The angular relation of the head assembly 14 relative to the supporting base 10 can of course be varied as desired by grasping the head assembly 14 and rotating it about the axis of the projection 54, the spring 56 being compressed as the serrations 60 and 62 move relative to each other. The spring 56 holds the head assembly 14 in any adjusted position to which it is moved relative to the base 10 with a sufficient force to prevent the head assembly from unintentionally moving out of adjusted position by bumps or vibration to which the vehicle is subjected.

The body portion 16 of the head assembly 14 is provided with a spherical recess 64 having a projection 66 extending from its center at an appropriate angle to provide advantageous adjustment, such as at right angles to the projection 54 by which the head assembly is mounted on the supporting base 10.

The mirror shell 20 is provided with a spherical portion 68 adapted to project into the spherical recess 64, and be retained therein by a spherical washer 70. The washer 70 is preloaded by a spring 72 surrounding the projection 66, and it is held in place by a washer 72 retained in place by the flanged end of the projection 66 as illustrated at 76.

The outer edges of the shell 20 may be crimped over the edge of the mirror 22 as illustrated at 78 to hold it in place. The mirror 22 may of course be adjusted angularly relative to the body portion 16 by grasping the shell 20 and moving it angularly relative to the body portion 16, the spring 72 retaining the shell in any angularly adjusted position to which it is moved.

The longitudinal axis 12 of the supporting base 10 extends substantially in alignment with the longitudinal axis of the vehicle. By rotating the head assembly 14 about the projection 54 the angular relation of the body portion 16 may be adjusted about an axis substantially perpendicular to the axis 12 of the supporting base 10 and of the vehicle. The mirror 22 may of course also be adjusted angularly relative to the body portion 16 by moving the mirror shell 20 relative to the body portion 16. A pair of mirrors 22 mounted on a vehicle may thus be readily adjusted to permit the driver to observe rear road and traffic conditions on both sides of the vehicle. Since such a large range of adjustment is provided, my improved mirrors may be readily adjusted to meet the requirements of individual drivers varying widely in stature.

It will of course be understood that my invention is not limited to a construction wherein the support 50 of the supporting base and the mating portion 52 of the body portion 16 of the head assembly 14 are in a plane parallel with the vehicle contacting portion of the base 10. The angular relation of the contacting surfaces 50 and 52 may be varied to incline the projection 54 at an angle of approximately 45° to each side of the right angular relation relative to the axis 12 of the base 10 as viewed in Fig. 3 without departing from the spirit of my invention.

It will also be apparent that my dual adjustment feature of a rear view mirror may be employed with mirrors having conventional supporting arms, and is not limited to mirrors having supporting bases of the so-called panel type.

I claim:

1. In a rear view mirror, a supporting base adapted to be secured to a side panel of a motor vehicle and having an aperture adjacent one of its ends, a screw threaded into the base, a cam bracket having an aperture to receive the head of the screw and an elongated slot adapted to receive the shank of the screw and communicating with the aperture, means to attach opposite ends of the bracket to the side of a vehicle, the bracket being so proportioned that when the head of said screw in the base is projected through the aperture in the bracket and the base is shifted longitudinally thereof to move the shank of the screw in the elongated slot of the bracket said base is moved toward the side of the vehicle, and a fastener adapted to project through the aperture adjacent one end of the base and through the side panel of the vehicle to lock the base against longitudinal movement on the bracket.

2. A rear view mirror assembly for a motor vehicle comprising a supporting base adapted to be secured to and extend outwardly from the side of a vehicle and having a centrally apertured substantially flat circular support, a mirror shell having a spherical centrally apertured attaching portion, an intermediate member having a substantially flat circular portion adapted to engage the support of the base and having a first projection adapted to extend through the centrally apertured support of the base whereby the intermediate member may be adjusted angularly about an axis extending substantially perpendicular to the vehicle contacting surface of the base, and cooperating indexing and spring connecting means to yieldingly hold the intermediate member in angularly adjusted positions on the base, the intermediate member having a second projection surrounded by a spherical recess to receive the spherical attaching portion of the shell, the second projection extending through the aperture in the spherical attaching portion of the shell whereby the shell may be adjusted angularly relative to the intermediate member, the first and second projections carried by the intermediate member to extend into the base and into the mirror shell extending substantially at right angles relative to each other, and a mirror carried by the mirror shell.

3. A rear view mirror assembly comprising a mirror, a shell supporting the mirror, a base spaced from the shell, an intermediate member positioned between the shell and base and having angularly related projections adapted to extend into the shell and base, connecting means comprising a spherical portion of the shell surrounding one of the projections of said member and adapted to nest within a spherical recess of said member whereby the shell may be adjusted angularly relative to said member, and connecting means comprising cooperating substantially flat circular contacting surfaces of said member and base surrounding the other of the projections of said member whereby said member and the mirror shell carried thereby may be adjusted angularly about the base.

4. A rear view mirror comprising a base having an inner surface adapted to contact a vehicle and an outer substantially flat circular supporting surface, a member having an inner substantially flat circular portion adapted to contact the outer substantially flat circular supporting surface of the base, indexing and yieldable connecting means between the base and said member whereby said member may be adjusted angularly about an axis extending substantially perpendicular to the inner surface of the base, said member having a spherical recess the central axis of which extends at an angle to the axis of the connecting means between the base and said member, a mirror shell having a spherical attaching portion adapted to be secured in the spherical recess of said member for angular adjustment relative thereto, and a mirror carried by the mirror shell.

5. A rear view mirror adapted to be secured to the side of a motor vehicle comprising a hollowed out base of generally streamlined contour having an inner vehicle contacting surface and an outer substantially flat circular supporting surface, means including a threaded boss positioned substantially midway between opposite ends of the base and extending toward the inner surface of the base for the reception of fastening means whereby the base may be secured to a motor vehicle, a member having an inner substantially flat circular portion adapted to contact the outer supporting surface of the base, connecting means between the base and said member whereby said member may be adjusted angularly about an axis extending substantially perpendicular to the inner surface of the base, a mirror shell, angularly movable connecting means between the mirror shell and said member, and a mirror positioned in the shell.

CARLTON G. KOONTER.

REFERENCES CITED

The following references are of record in the file of this patent:

UNITED STATES PATENTS

| Number | Name | Date |
| --- | --- | --- |
| 1,932,697 | Jankovic | Oct. 31, 1933 |
| 2,333,671 | Peters et al. | Nov. 9, 1943 |
| 2,452,316 | Morley | Oct. 26, 1948 |

Disclaimer 2,533,475.—*Carlton G. Koonter*, Fairhaven, Mich. REARVIEW MIRROR FOR MOTOR VEHICLES. Patent dated Dec. 12, 1950. Disclaimer filed July 16, 1951, by the assignee, *George C. Knight Company*.
Hereby enters this disclaimer to claim 3 of said patent.
[*Official Gazette August 14, 1951.*]